United States Patent
Mitchell

(10) Patent No.: US 10,445,792 B2
(45) Date of Patent: Oct. 15, 2019

(54) COMFORT-BASED GARMENT MANAGEMENT

(71) Applicant: ENT. SERVICES DEVELOPMENT CORPORATION LP, Houston, TX (US)

(72) Inventor: Guy Mitchell, Aurora, CO (US)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 130 days.

(21) Appl. No.: 15/114,796

(22) PCT Filed: Jan. 31, 2014

(86) PCT No.: PCT/US2014/014242
§ 371 (c)(1),
(2) Date: Jul. 27, 2016

(87) PCT Pub. No.: WO2015/116192
PCT Pub. Date: Aug. 6, 2015

(65) Prior Publication Data
US 2016/0350819 A1 Dec. 1, 2016

(51) Int. Cl.
G06Q 30/02 (2012.01)
G06Q 10/08 (2012.01)
G06Q 30/06 (2012.01)
A41D 1/00 (2018.01)
G06Q 30/00 (2012.01)

(52) U.S. Cl.
CPC ......... G06Q 30/0282 (2013.01); A41D 1/002 (2013.01); G06Q 10/087 (2013.01); G06Q 30/016 (2013.01); G06Q 30/0621 (2013.01)

(58) Field of Classification Search
CPC ....... A61B 5/6804; A61B 5/0002; A61B 5/11; A61B 5/04005; G06Q 30/0282; G06Q 10/087
USPC ................................................. 702/127, 182
See application file for complete search history.

(56) References Cited

U.S. PATENT DOCUMENTS

| | | | |
|---|---|---|---|
| 5,515,268 A | 5/1996 | Yoda | |
| 5,914,659 A | 6/1999 | Herman et al. | |
| 6,160,254 A | 12/2000 | Zimmerman et al. | |
| 7,677,079 B2 | 3/2010 | Radziszewski et al. | |
| 8,749,380 B2 | 6/2014 | Vock et al. | |

(Continued)

FOREIGN PATENT DOCUMENTS

| WO | WO-2004111484 | 12/2004 |
|---|---|---|
| WO | WO-2009150670 | 12/2009 |
| WO | WO-2013116242 | 8/2013 |

OTHER PUBLICATIONS

Guido Giober; "Measuring Joint Movement Through Garment-integrated Wearable Sensing"; Sep. 8-12, 2013; 6 pages.

(Continued)

*Primary Examiner* — An H Do
(74) *Attorney, Agent, or Firm* — Sheppard Mullin Richter & Hampton LLP

(57) ABSTRACT

Comfort-based garment management can include establishing a sensor output threshold for a garment based on comfort data, receiving sensor output data from a number of sensors integrated with the garment, comparing the sensor output data with the sensor output threshold, and sending a notification to a party associated with the garment in response to the sensor output data crossing the sensor output threshold.

14 Claims, 4 Drawing Sheets

(56) References Cited

U.S. PATENT DOCUMENTS

| | | |
|---|---|---|
| 2010/0065632 A1 | 3/2010 | Babcock et al. |
| 2012/0136231 A1 | 7/2012 | Markel |
| 2012/0226197 A1 | 9/2012 | Sanders et al. |
| 2013/0192071 A1 | 8/2013 | Esposito et al. |
| 2013/0274587 A1 | 10/2013 | Coza et al. |
| 2013/0290106 A1 | 10/2013 | Bradley et al. |

OTHER PUBLICATIONS

PCT Search Report/Written Opinion—Application No. PCT/US2014/014242 dated Oct. 28, 2014—13 pages.

COMFORT-BASED GARMENT MANAGEMENT

BACKGROUND

Sensors can be included in garments. For example, sensors can be integrated into garments and output measurements. The measurements can include measurements of forces experienced by the garment and the user of the garment.

DETAILED DESCRIPTION

Garment supply chains can provide garments from manufacturers to consumers. Conventional methods of garment management within a supply chain rely on modeling supply and demand. Predicting demand and managing supply in the garment industry can be particularly challenging. Due to the ever-changing landscape of garment preferences, the lead-time gap in the garment industry must be very brief compared with other commodities. That is, if a garment manufacturer takes too long in manufacturing the garment, the garment may be become undesirable to the consumer base. This is often at odds with providing a high quality garment that fits each consumer's individual needs as such an endeavor often requires increased lead-time. Current supply and demand models focus on managing a garment based on economic factors and consumer purchasing habits. However, these models are incomplete and lack important information not only in predicting/managing demand of individual consumers for particular garments, but are also unable to provide specific feedback to manufacturers, retailers, and/or consumers as to what is making their garments appealing to individual consumers and how the garment and/or similar garments might be improved to appeal to a consumer.

In contrast, the embodiments of the present disclosure describe a comfort-based garment management system for managing a garment with respect to the manufacturer, the retailer, and the consumer. Managing a garment within a supply chain can be dependent on understanding subjective and individualistic determinations of the garment's desirability. These determinations can include determinations of a garment's comfort.

Individuals' perceptions of garment comfort can influence their behavior with regard to purchasing the garment, replacing the garment, and buying similar garments. Understanding and predicting these perceptions can provide a retailer and/or manufacturer guidance with respect to managing a garment within a supply chain. Furthermore, it can provide an opportunity for a dialog with the individual consumers regarding their management of the garment and related purchasing decisions.

Sensors can be used to measure physical quantities. Sensors can be incorporated into clothing. Associating sensor measurements (e.g., sensor outputs) with subjective determinations, such as comfort, can help to quantify what comfort means with respect to a consumer (e.g., an individual consumer, a group of consumers, a type of consumer, etc.) of a garment.

Figure 1:
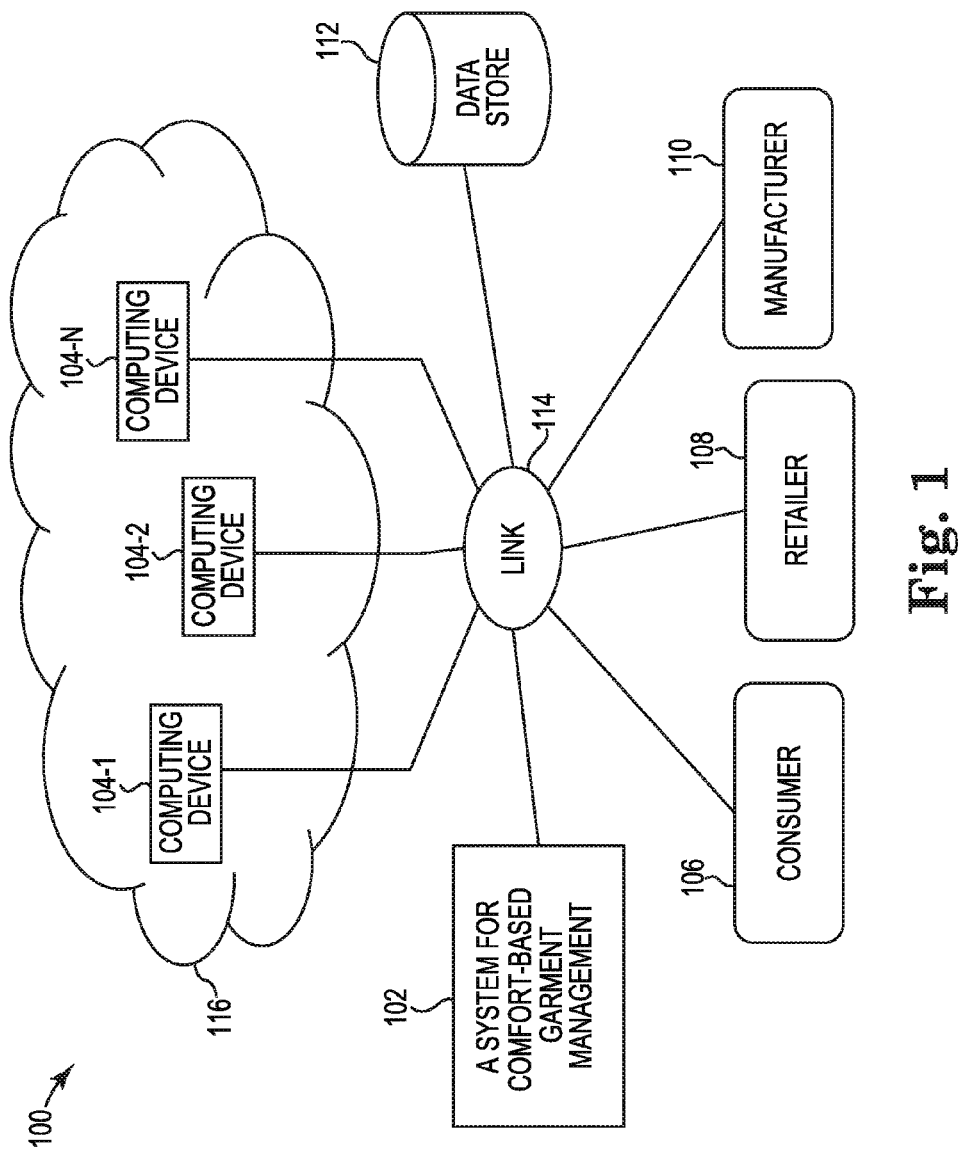
FIG. 1 illustrates an example of an environment for comfort-based garment management according to the present disclosure.

FIG. 1 illustrates an example of an environment 100 for comfort-based garment management according to the present disclosure. The environment 100 is shown to include a system 102 for comfort-based garment management, computing devices 104-1, . . . , 104-N (e.g., servers), a consumer 106, a retailer 108, a manufacturer 110, a data store 112, a link 114, and a cloud based computing system 116. The data store 112 can be a single data store or a distributed data store and can be analogous to the data store discussed with respect to FIG. 2. The data store can be all or partially based in the cloud 116.

A given computing device 104-1, . . . , 104-N can include a web server, a mainframe, a cloud server, an application server, a client server, and/or a data server, among other types of servers. A consumer 106, a retailer 108, and a manufacturer 110 can include any device associated with the consumer 106 of a garment, the retailer 108 of a garment, and the manufacturer 110 of the garment. The devices can include any suitable computing devices with browsers or other applications to receive data, communicate data and/or process data. Furthermore, the consumer 106, retailer 108, and manufacturer 110 can each include a number of associated garments having a number of sensors capable of measuring physical attributes and communicating data. For example, the number of sensors can be integrated into the garment. These sensors can be capable of transmitting their measurements independently of any ancillary device (e.g., a separate computing device capable of receiving, processing, and/or receiving data including sensor measurements) and/or capable of transmitting their measurements to an ancillary device of the consumer 106, retailer 108, and/or manufacturer 110 for further processing and/or transmittal over the link 114.

Link 114 (e.g., a network) represents a cable, wireless, fiber optic, and/or remote connection via a telecommunication link, an infrared link, a radio frequency link, and/or other connectors or systems that provide electronic communication. That is, the link 114 can, for example, include a link to an intranet, the Internet, or a combination of both, among other communication interfaces. The link 114 can also include intermediate network devices such as proxy servers, routers, switches, load balancers, and the like.

As illustrated in FIG. 1, a cloud system 116 can include a public cloud system, a private cloud system, and/or a hybrid cloud system. For example, an environment (e.g., IT environment) including a public cloud system and a private cloud system can include a hybrid environment and/or a hybrid cloud system. A public cloud system can include a service provider that makes resources (e.g., applications, storage, and/or data), available to the public over the Internet. A public cloud system can be free or offered for a fee, for example.

A private cloud system can include computing architecture that provides hosted services to a limited number of people behind a firewall. For example, a private cloud can include an Enterprise Resource Planning (ERP) system, a number of databases, and virtualization (e.g., virtual machines). For instance, a private cloud system can include a computing architecture that provides hosted services to a limited number of a plurality of nodes (e.g., computers)

behind a firewall. The ERP, for example, can integrate internal and external management information across an entire supply chain, enterprise, and/or organization. A number of databases can include an event database, event archive, configuration management database (CMDB), and/or a performance metric database, for example. Virtualization, for example, can include the creation of a number of virtual resources that are allocated from physical resources but not directly limited by the capabilities of particular physical resources. Examples of virtualized resources include hardware platforms, operating systems, storage devices, and/or network resources, among others. For example, a virtual storage device can provide up to a particular capacity of storage that is physically provided by one, less than one, or more than one physical storage device depending on the amount of storage space allocated to the virtual storage device and therefore not directly limited by the capabilities of any particular device(s). The public cloud system and the private cloud system can be bound together, for example, through the application in the public cloud system and the ERP in the private cloud system.

A hybrid cloud, for example, can include a mix of traditional server systems, private cloud systems, public cloud systems, and/or dynamic cloud services. For instance, a hybrid cloud can involve interdependencies between physically and logically separated services consisting of multiple systems. A hybrid cloud, for example, can include a number of clouds (e.g., two clouds) that can remain unique entities but can be bound together.

The system 102 for comfort-based garment management can represent different combinations of hardware or hardware and instructions for comfort-based garment management. The system 102 for comfort-based garment management can include a computing device, for instance, computing device 350 as discussed with respect to FIG. 3. The system 102 can include engines analogous to engines described herein with respect to FIG. 2. For example, the system 102 can include a baseline engine, a comfort engine, a comparison engine, and a notification engine, as described herein with respect to FIG. 2. A portion or all of the system 102 for comfort-based garment management can be implemented using resources of the cloud 116.

In FIG. 1, the consumer 106, retailer 108, and/or manufacturer 110 can transmit data to computing devices 104-1, . . . , 104-N in the cloud system 116. This data can include any data (e.g., retail metrics, sensor outputs, specifications, consumer dimensions, consumer identities, etc.) useful in comfort-based garment management. The data in the cloud system 116 can then be shared, analyzed, and utilized in managing a garment at any stage of the supply chain. This data can also be utilized in the system 102 for comfort-based garment management.

Figure 2:
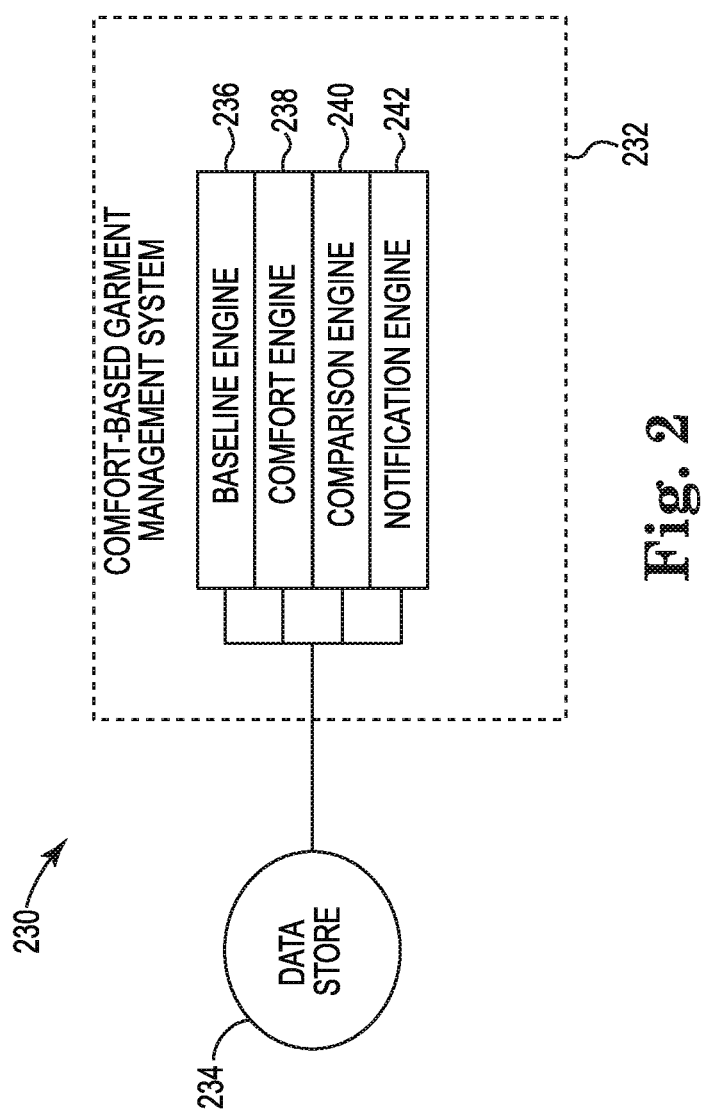
FIG. 2 illustrates a diagram of an example of a system for comfort-based garment management according to the present disclosure

FIG. 2 illustrates a diagram of an example of a system 230 for comfort-based garment management according to the present disclosure. The system 230 can include a data store 234, a comfort-based garment management system 232, and/or a number of engines (e.g., the baseline engine 236, the comfort engine 238, the comparison engine 240, and the notification engine 242). The comfort-based garment management system 230 can be in communication with the data store 234 via a communication link, and can include, manage, and/or employ the number of engines (e.g., the baseline engine 236, the comfort engine 238, the comparison engine 240, and the notification engine 242) to perform various functions. The comfort-based garment management system 230 can include additional or fewer engines than illustrated to perform the various functions described herein.

The number of engines (e.g., the baseline engine 236, the comfort engine 238, the comparison engine 240, and the notification engine 242) can include hardware or a combination of hardware and programming to perform a number of functions described herein (e.g., establishing a sensor output threshold for a garment based on comfort data, receiving sensor output data from a number of sensors integrated with the garment, comparing the sensor output data with the sensor output threshold, sending a notification to a party associated with the garment in response to the sensor output data crossing the sensor output threshold, etc.). The programming can include program instructions (e.g., software, firmware, etc.) stored in a memory resource (e.g., computer readable medium, machine readable medium, etc.) as well as hard-wired program (e.g., logic).

The baseline engine 236 can include hardware and/or a combination of hardware and programming to establish a sensor output threshold for a garment based on comfort data. The garment of system 230 can be any garment (e.g., any item of clothing, accessory, headwear, hand wear, footwear, jewelry, protective ware, athletic equipment, worn fiber and/or textile, etc.) or number of garments (e.g., an outfit, related garments, etc.).

Examples herein can include sensors integrated with the garment. The sensors can be integrated into the garments. In example embodiments, sensors can be incorporated within the garment (e.g., woven into the fabric, implanted into the material, etc.). Alternatively or additionally, the sensors can be external integrated. For example, the sensors can be applied to the inside and/or outside surface of the garment. Examples can include washable sensors that may be washed along with the garments without damaging the sensors and/or the garment.

The sensors can continuously and/or periodically sense physical quantities and convert them to data (e.g., sensor outputs). Garment sensors can include any instrument capable of measuring a physical quantity and/or converting the measurement to a signal. For example, garment sensors can include, individually or in combination, any number of instruments that are capable of sensing forces exerted on a garment, sensing forces exerted on a wearer of the garment, sensing properties of the garment, and/or sensing properties of the wearer of the garment. Examples herein can include heat sensors, pressure sensors, accelerometers, gyroscopes, temperature sensors, footfall sensors, flex sensors, thickness sensors, chemical sensors, tensile load sensors, compressive load sensors, light sensors, and perspiration sensors, among others.

The comfort data utilized by baseline engine 236 can include data related to the sensor outputs of a number of sensors integrated with a garment. The comfort data can be specific to a particular consumer/garment or generic to groups of consumers/garments. For example, the comfort data can include consumer dimensions (e.g., height, weight, bust, distance around waist, hip width, inseam, shoulder to wrist length, armpit to wrist length, distance around shoulders, distance around head, distance around neck, foot length, foot width, sizes, other measurements, etc.). These dimensions, which can be supplied by an individual consumer, the retailer, and/or the manufacturer, can be based on dimensions unique to the particular consumer purchasing and/or wearing a particular garment or considering purchasing that garment. In this manner, the comfort data is unique and specific to a particular consumer. Alternatively, the consumer dimensions can be generic dimensions associated with a group of consumers. For example, a retailer and/or manufacturer can develop an average set of dimensions associated with clientele consumers and these dimensions can be utilized as comfort data.

The consumer dimensions can be input by the consumer, retailer, and/or manufacturer at any point in the supply chain of a garment being managed (e.g., before the sale of a garment, during a garment fitting, during the sale of a garment, after the sale of a garment, etc.). Alternatively, the dimensions can be retrieved from records (e.g., electronic records stored in the cloud and/or on devices of the consumer, retailer, or manufacturer). These records can be based on historical dimensions of the consumer that were input with respect to previous garment purchases.

The comfort data can additionally include expected (e.g., predicted based on a model, predicted based on prior knowledge, etc.) sensor output values. That is, the comfort data can include a number of expected sensor output values of a number of sensors integrated with a garment being managed. The expected sensor output values can be expected sensor values from sensors integrated into the garment being managed that are predicted to coincide with a comfortable fit for the consumer (e.g., individual consumer, group consumers, etc.). These expected sensor output values can be received from a consumer, a retailer, and/or a manufacturer and/or can be derived from other information. For example, the consumer dimensions can be analyzed with the use of a model to generate the expected sensor output values from sensors integrated into the garment being managed that are predicted to coincide with a comfortable fit for the consumer having the consumer dimensions.

Furthermore, the expected sensor output values predicted to coincide with a comfortable fit for the consumer can be based on historical sensor output values. For example, if a particular consumer has previously provided sensor output values from sensors integrated into a garment (e.g., an identical garment, a similar garment, a related garment, etc.) which coincided with a comfortable fit for that consumer with respect to that garment, then the previously provided sensor output values can be utilized as historical sensor output values in predicting expected sensor values from sensors integrated into the garment being managed that are predicted to coincide with a comfortable fit for that consumer. The historical sensor output values can be utilized in an unmodified state as the expected sensor output values and/or modified for greater accuracy with respect to the garment being managed.

The use of historical sensor output values can also be applied more generically. That is, the historical sensor output values from one consumer or group of consumers can be utilized in an unmodified and/or modified state in predicting expected sensor values for other consumers. For example, if consumer A and consumer B have similar consumer dimensions and historical sensor output values exist for consumer A for a particular garment, then the historical sensor output values for consumer A may be utilized with respect to consumer B in predicting expected sensor values from sensors integrated into a same or similar garment being managed.

In another example, if the manufacturer of a garment being managed has determined (e.g., based on knowledge, research, computer models, etc.) that certain sensor output values commonly correspond to a comfortable fit of the garment for its clientele, the manufacturer may designate these output values as expected sensor output values associated with a comfortable fit for that garment for an individual consumer. Likewise, a retailer may generate similar designations of expected sensor output values for a garment being managed.

The comfort data can additionally or alternatively include baseline sensor output values. A baseline sensor output value can include a number of actual outputs from a number sensors integrated with a garment being managed. For example, a baseline sensor output value can be a sensor output value from a sensor integrated with the garment being managed collected while the consumer is wearing the garment. This concept is equally applicable when the consumer is wearing an identical garment, a similar garment, and/or a related garment to the garment being managed. By collecting the baseline sensor output values while the consumer is wearing the garment, the consumer can simultaneously identify the sensor output values coinciding with his subjective determination of a comfortable fit of the garment. That is, a subjective determination of a comfortable fit by a particular consumer can be quantified by the coinciding sensor output values. The baseline sensor output values can be established at any time in the garment supply chain. For example, the baseline sensor output values can be established during manufacture, at the retailer, after purchase of the garment, and/or at any other time that the consumer is available to try on the garment. In some examples, the consumer of a garment being managed can try on the garment at a retailer. During this period the sensor output values from the garment being managed can be collected. The consumer can indicate to, for example, the retailer, while wearing the garment, whether the garment has a comfortable fit. Accordingly, upon each determination by the consumer that a garment has a comfortable fit the coinciding sensor output values of the sensors integrated with that garment are collected. These collect sensor output values can be baseline sensor output values. Additionally, a number of these sensor output values can be combined in order to generate an average baseline sensor output value. The baseline sensor output values can, for example, be uploaded to the cloud by the retailer and or the consumer. In some examples, the baseline sensor output values may be uploaded to a consumer's electronic device to be managed and uploaded to the cloud by an application.

Establishing a sensor output threshold based on the above described comfort data can include characterizing an acceptable range of sensor output values from sensors integrated with a garment being managed that will generally coincide a comfortable garment fit for the consumer of the garment. For example, establishing the sensor output thresholds can include defining threshold sensor output values that represent a minimum and/or a maximum sensor output value from a garment being managed that would coincide with a comfortable fit of the garment with respect to the consumer based on what the comfort data reveals about the preferences of the consumer. As an example, the minimum and maximum sensor output values can be based on a baseline sensor output value coinciding with a comfortable fit determination of the consumer for the garment being managed. Additionally, the minimum and maximum sensor output values can be based on an expected sensor output value of sensors integrated with the garment being managed that is predicted to coincide with a comfortable fit for the consumer. Sensor output values from the sensors integrated into the garment being managed that fall outside of these thresholds can represent sensor output values corresponding with an uncomfortable or undesirable fit of the garment.

Establishing the sensor output thresholds as described herein can include establishing thresholds with respect to the sensor output values of each individual sensor integrated with a garment being managed, with respect to the sensor output values of groups of sensors integrated with a garment being managed, and/or with respect to comfort scores associated with the sensor output of sensors integrated with a garment being managed. A comfort score can be a score derived from any combination of the sensor output values of a number of sensors integrated with a garment being managed. For example, the comfort score can be a score based on applying a mathematical algorithm to the sensor output data of a number of sensors integrated with a garment being managed, wherein the sensor outputs are assigned predetermined weights. For example, if pressure and heat sensor output values are better indicators of comfort in the garment being managed than other sensor output values of the number of sensors integrated with a garment being managed, then the heat and pressure sensor output values can be weighted more heavily in generating the comfort score.

The comfort engine 238 can include hardware and/or a combination of hardware and programming to receive sensor output data from a number of sensors integrated with the garment being managed. The sensor output data received utilizing the comfort engine can be sensor output data generated subsequent to establishing the sensor output threshold for the garment based on comfort data.

The number of sensors of a garment can generate sensor output data (e.g., sensor output values, cumulative scores associated with sensor output values of a number of sensors of a garment, etc.) continuously or periodically. For example, the number of sensors of a garment being managed can generate sensor output data continuously upon being activated (e.g., upon initially energizing the sensors, upon activating the sensors through an electronic command, etc.). Alternatively the sensors of a garment can generate output periodically in response to a trigger (e.g., in response to stimuli, in response to periodic energizing of the sensors, in response to periodic electronic commands, etc.).

Receiving the sensor output data can also occur continuously or periodically. Receiving the sensor output data can include receiving the sensor output data in the cloud. For example, the sensor output data can be uploaded to the cloud from the garment sensors directly, and or from the garment sensors via an electronic device receiving the sensor output data continuously. Alternatively, the garment sensor output data can be received periodically. For example, the sensor output data can be uploaded to the cloud in response to a trigger (e.g., an electronic command, a scheduled upload, a query by the comfort-based garment management system 232, automatically by the presence of a data connection, submission of the data by the consumer to the retailer of the garment, submission of the data by the consumer to the manufacturer of the garment, etc.). Receiving the sensor output data from a number of sensors integrated with the garment being managed can occur without the consumer being aware that the sensor output data is being transmitted.

The comparison engine 240 can include hardware and/or a combination of hardware and programming to compare the sensor output data from the number of sensors integrated with a garment being managed with the established sensor output threshold. Comparing the sensor output data with the sensor output threshold can include comparing the sensor output data with the sensor output threshold in substantially real-time as the sensor output data is received from the sensors integrated with the garment. Alternatively, the sensor output data can be compared to the sensor output threshold upon retrieving one or both of the sensor output data and the sensor output threshold from the cloud. For example, comparing the sensor output data with the sensor output threshold can include determining whether the sensor output data is outside of the established thresholds and, if so by how much.

The notification engine 242 can include hardware and/or a combination of hardware and programming to send a notification to a party associated with the garment in response to the sensor output data from the number of sensors integrated with a garment crossing the sensor output threshold. The notification can include any type of communication (e.g., an email, a text message, an alert, a signal, a telephone message, a paper mailing, etc.).

The contents of the notification can vary greatly and can, for example, depend on the intended recipient. For example, if the intended recipient of the notification is the consumer that purchased the garment being managed then the notification can include information related to the garment he purchased. As an example, the notification could be a notification that the garment is reaching the end of a predefined lifecycle. In such examples, the manufacturer and/or retailer can define a lifecycle of a garment as coinciding with its comfort level for the consumer as indicated by the sensor out data from the number of sensors integrated with the garment. For example, the manufacturer and/or retailer may have determined that once the sensor output data for a garment being managed has crossed the established sensor output threshold for the garment, the garment has reached or is nearing the end of its lifecycle and should be replaced. Therefore, the notification to the consumer can include a notification that the garment should be replaced.

Additionally, if the intended recipient of the notification is the consumer that purchased the garment being managed then the contents of the notification can include advertisements from the retailer and/or manufacturer. These advertisements can include information (e.g., stock levels, prices, promotions, coupons, rebates, etc.) about identical garments, similar garments, related garments, improved garments, and/or different garments. In this manner, the comfort-based garment management system described herein allows the consumer of a garment to manage his garment and his garment related purchasing decisions.

If the intended recipient of the notification is a retailer (e.g., that sold that garment, that now sells identical garments, the now sells similar garments, that now sells, related garments, that now sells improved garments, etc.) then the contents of the notification can include retailer-relevant information related to the garment. For example, the notification can include a notification that the garment being managed is in need of replacement and/or will soon need to be replaced. Such a notification can include an identification of the garment being managed and/or identification (e.g., name, telephone number, email address, fax, location, address, zip code, age, sex, dimensions, race, etc.) of the consumer of the garment being managed. The notification can include a notification that the identified consumer should be included in directed advertising and mailings and might be interested in particular offerings of the retailer. The notification can also include a notification whether the retailer has a garment (e.g., an identical garment, a similar garment, a related garment, etc.) in stock at the moment. If the retailer does not have the garment in stock, the notification can include a suggestion of garments (e.g., type, size, color, etc.) that the retailer should bring in to stock. Additionally, if the retailer has an appropriate garment to replace the worn out garment being managed, but the in-stock garment requires modification (e.g., tailoring) to meet the customers specifications (e.g., to create a fit that would produce sensor output data from a number of sensors integrated with the garment that will coincide with the customers definition of a comfortable fit), then the notification can include instructions as to the necessary modifications to the in-stock item.

If the intended recipient of the notification is a manufacturer that manufactured the garment being managed, then the contents of the notification can include manufacturer-relevant information related to the garment. For example, the notification can include the sensor output data of an identified garment for quality control and garment improvement uses. The notification can also include identification of the consumer of the garment being managed and/or identification of an associated retailer (e.g., a retailer where the consumer purchased the garment, retailers near the consumer's location, retailers carrying identical and/or similar garments, etc.) and its current stock levels of a garment (e.g., identical garment, similar garment, a related garment, etc.). Additionally, the notification can include a notification that the manufacturer needs to ship stock of a garment (e.g., identical garment, similar garment, a related garment, etc.) to a retailer associated with the consumer.

Figure 3:
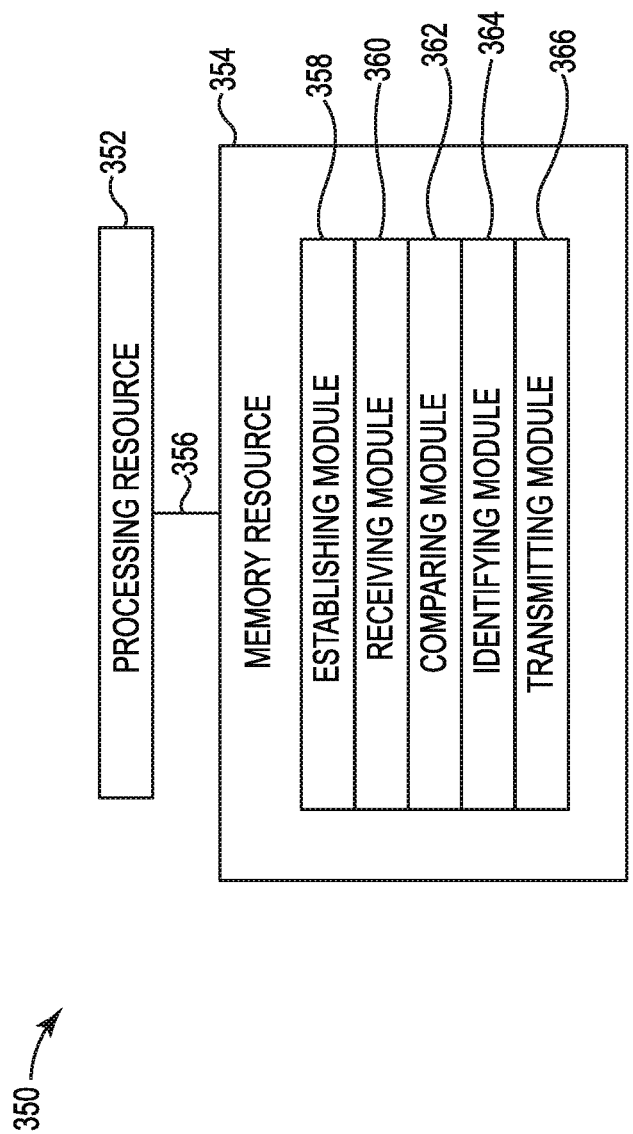
FIG. 3 illustrates a diagram of an example of a computing device according to the present disclosure

FIG. 3 illustrates a diagram of an example of a computing device 350 according to the present disclosure. The computing device 350 can utilize software, hardware, firmware, and/or logic to perform a number of functions described herein. The computing device 350 can be any combination of hardware and program instructions to share information. The hardware, for example, can include a processing resource 352 and/or a memory resource 354 (e.g., computer-readable medium (CRM), machine readable medium (MRM), database, etc.). A processing resource 352, as used herein, can include any number of processors capable of executing instructions stored by a memory resource 354. The processing resource 352 may be implemented in a single device or distributed across multiple devices. The program instructions (e.g., computer readable instructions (CRI)) can include instructions stored on the memory resource 354 and executable by the processing resource 352 to implement a desired function (e.g., establishing a sensor output threshold for a garment based on comfort data, establishing retail metric thresholds for the garment, receiving sensor output data from a number of sensors integrated with a garment, receiving retail metrics for the garment, comparing the sensor output data with the sensor output threshold, comparing the retail metrics for the garment with the retail metric thresholds, identifying a suspected defective garment based on the sensor output threshold comparison and the retail metric threshold comparison, transmitting a number of notifications to a number of parties associated with the garment in response to the identification, etc.).

The memory resource 354 can be in communication with a processing resource 352. A memory resource 354, as used herein, can include any number of memory components capable of storing instructions that can be executed by the processing resource 352. The memory resource 354 can be a non-transitory CRM or MRM. The memory resource 354 may be integrated in a single device or distributed across multiple devices. Further, the memory resource 354 may be fully or partially integrated in the same device as the processing resource 352 or it may be separate but accessible to that device and the processing resource 352. Thus, it is noted that the computing device 350 may be implemented on a participant device (e.g., host), on a server device, on a collection of server devices, and/or a combination of the participant device and the server device.

The memory resource 354 can be in communication with the processing resource 352 via a communication link (e.g., a path) 356. The communication link 356 can be local or remote to a machine (e.g., a computing device) associated with the processing resource 352. Examples of a local communication link 356 can include an electronic bus internal to a machine (e.g., a computing device) where the memory resource 354 is one of volatile, non-volatile, fixed, and/or removable storage medium in communication with the processing resource 352 via the electronic bus.

A number of modules 358, 360, 362, 364, 366 can include CRI that when executed by the processing resource 352 can perform a number of functions. The number of modules 358, 360, 362, 364, 366 can be sub-modules of other modules. For example, the receiving module 360 and the comparing module 362 can be sub-modules and/or contained within the same computing device. In another example, the number of modules 358, 360, 362, 364, 366 can comprise individual modules at separate and distinct locations (e.g., CRM, etc.).

Each of the number of modules 358, 360, 362, 364, 366 can include instructions that when executed by the processing resource 352 can function as a corresponding engine, including those as described herein. For example, the establishing module 358 can include instructions that when executed by the processing resource 352 can function as the baseline engine 236, the receiving module 360 can include instructions that when executed by the processing resource 352 can function as the comfort engine 238, the comparing module 362 can include instructions that when executed by the processing resource 352 can function as the comparison engine 240; and the transmitting module 366 can include instructions that when executed by the processing resource 352 can function as the notification engine 242.

The establishing module 358 can include CRI that when executed by the processing resource 352 can establish a sensor output threshold for a garment being managed based on comfort data. As described above, the comfort data can be consumer dimensions, expected sensor output values, and/or baseline sensor output values. The thresholds, as described above, can be based on any of the comfort data and can define sensor output values corresponding to maximum and/or minimum sensor output values of a number of sensors integrated with the garment being managed coinciding with a comfortable fit of the garment being managed for the consumer of the garment. Additionally, the establishing module 358 can include CRI that when executed by the processing resource 352 can establish retail metric thresholds for the garment being managed. Retail metrics can include any retail-related key performance indicators. For example, a retail metric of the garment being managed can include sales of identical garments, sales of similar garments, sales of related garments, the average age of inventory of identical garments, the average age of inventory of similar garments, the average age of inventory of related garments, the age of inventory for the garment being managed, the number of times that the garment being managed has been tried on, the number of times that the garment being managed has been identified as uncomfortable by a consumer trying on the garment being managed, etc. . . . .

Establishing a retail metric threshold can include establishing retail metric values that, once exceeded, suggest that the garment being managed may be defective. For example, establishing a retail metric threshold can include establishing that the average amount of times that a garment (identical or similar to the garment being managed) is tried on be a number of consumers before being purchased is three times. Therefore, once the garment being managed has been tried on more than three times it can suggest that the garment is defective. Accordingly, a retail metric threshold of a garment being tried on three times can be established. Additionally, establishing a retail metric threshold can include establishing a retail metric threshold based on a combination of retail metrics. For example, establishing a retail metric threshold for a garment being managed can include establishing that the average age of inventory for identical and/or similar garments is three months at a retailer and the average amount of times that an identical and/or similar garment is tried on before being purchased is three. Therefore, once the age of inventory for the garment being managed exceeds three months and the garment being managed has been tried on more than three times it can suggest that the garment is defective. Accordingly, a retail metric threshold of three months age of inventory and three try on sessions for the garment being managed can be established.

The retail metric threshold for a garment being managed can be established based on projections, industry standards, historical retail data and/or other retail information related to the garment being managed. For example, retailer and/or manufacturer records can be analyzed to determine expected retail metric values for the garment being managed and the thresholds can be established based on the retail metric values.

The receiving module 360 can include CRI that when executed by the processing resource 352 can receive sensor output data from a number of sensors integrated with a garment being managed. As described above, the sensor output data can be collected continuously or periodically. Receiving the sensor output data can include receiving the sensor output data in the cloud. Additionally, the receiving module 360 can include CRI that when executed by the processing resource 352 can receive retail metrics for the garment. The retail metrics can be received from the manufacturer and/or the retailer. For example, the retail metrics can be received in real-time from the retailer to provide an accurate current picture of the condition of the retailer's garment stock. The received retail metrics can include retail metrics for the retailer's entire garment stock or retail metrics specific to the garment being managed.

The comparing module 362 can include CRI that when executed by the processing resource 352 can compare the sensor output data of the number of sensors integrated with the garment being managed with the sensor output threshold and compare the retail metrics for the garment being managed with the retail metric thresholds.

The identifying module 364 can include CRI that when executed by the processing resource 352 can identify a suspected defective garment being managed based on the sensor output threshold comparison and the retail metric threshold comparison. Identifying a suspected defective garment can include identifying a suspected defective garment based on the sensor output data of the garment being managed crossing a sensor output threshold and/or the retail metrics for the garment being managed crossing the retail metric thresholds for the garment. For example, a garment being managed can be identified as a suspected defective garment based on the sensor output data of the garment indicating pressure measurements that exceed a threshold pressure measurement coinciding with a comfortable fit for the consumer of the garment being managed and the retail metrics for the garment being managed indicating that the garment has been tried on ten times and has an inventory age of five months. Identifying a suspected garment can include assigning a defect score to the garment. The defect score can increase with each instance of the sensor output data of the number of sensors integrated with the garment being managed crossing the sensor output threshold and/or the retail metrics of the garment being managed crossing the retail metrics thresholds. The defect score can also increase with increased magnitudes of violation of the sensor output threshold and/or retail metric threshold by the number of sensors of the garment and the retail metrics of the garment, respectively.

The transmitting module 366 can include CRI that when executed by the processing resource 352 can transmit a number of notifications to a number of parties associated with the garment being managed in response to the identification of the garment being managed as a suspected defective garment. The parties associated with the garment can, for example, include a consumer of the garment, a retailer of the garment, and/or a manufacturer of the garment.

The number of notifications can include a notification identifying the suspected defective garment. For example, the notification can include a notification to a consumer, retailer, and/or manufacturer of the garment specifying the identity (e.g., a description, an ID number associated physically and/or electronically with the garment, a stock keeping unit (SKU), any other information capable of identifying the particular garment, etc.) of the garment and notifying the party that the garment is suspected to be defective. Such a notification can include suggestions on how to address the defective garment being managed. For example, the suggestions can include instructions to inspect the garment, perform suggested remedial measures on the garment, send the garment for repair, send the garment for replacement, request new stock of the garment, and/or send new stock of the garment. For example, the notification can include a notification to the retailer identifying the suspected defective garment and a notification to the manufacturer to replace the suspected garment at the retailer with a non-defective garment.

Additionally, the number of notifications can include suggestions of a consumer and/or a retailer associated with a consumer that may match the suspected defective garment. For example, the notification can be a notification to a retailer identifying a specific consumer that might be interested in purchasing the suspected defective garment that the retailer has in stock. When the sensor output data from the number of sensors integrated with the suspected defective garment suggested a specific defect (e.g., a specific irregular dimension), the notification can, for example, include a particular consumer with consumer dimensions that match the irregular dimensions of the suspected defective garment. The suggestion can be based on analysis of the sensor output data from the number of sensors integrated with the suspected defective garment, retail metrics of the suspected defective garments, a consumer information database of the manufacturer, retailer, and/or consumer, etc. . . . .

Figure 4:
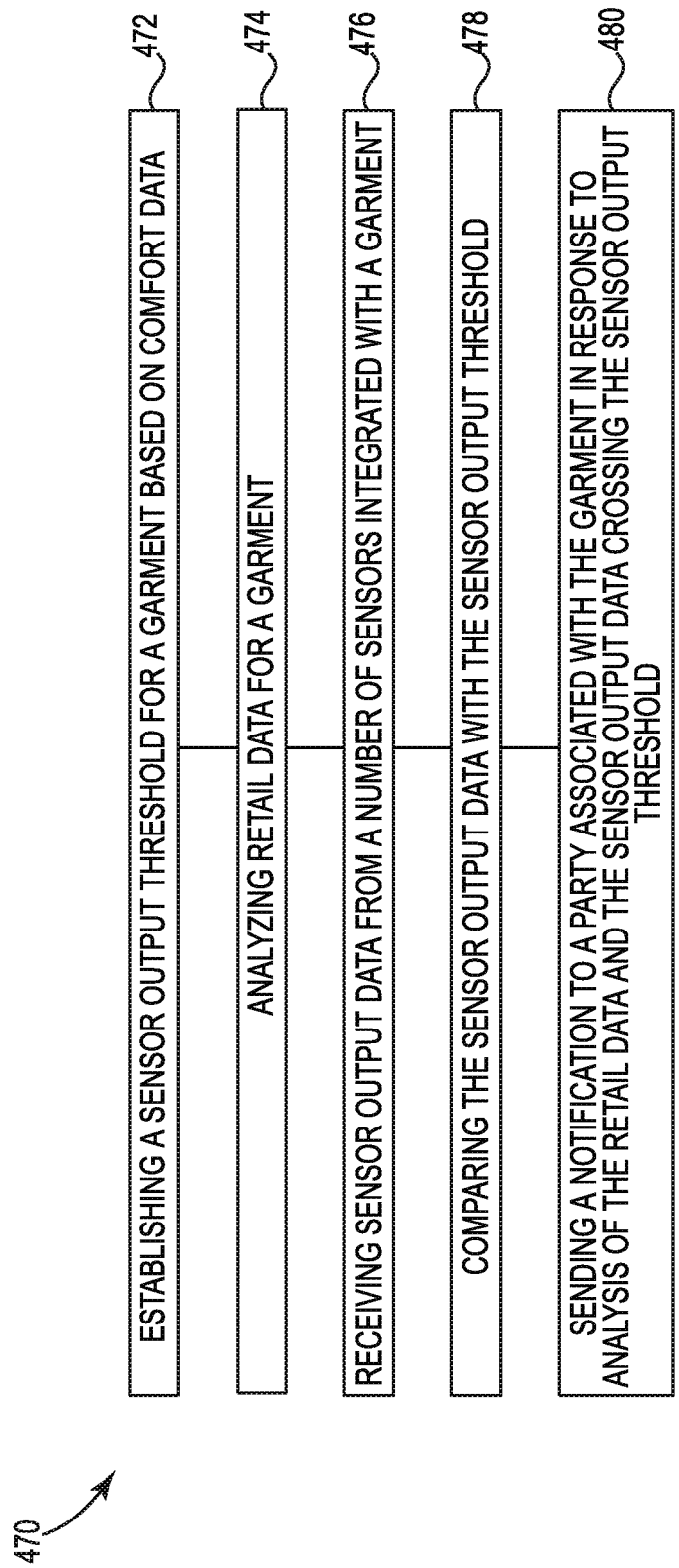
FIG. 4 is a flow chart of an example of a method for comfort-based garment management according to the present disclosure

FIG. 4 is a flow chart of an example of a method 470 for comfort-based garment management according to the present disclosure. Method 470 can be performed by a computing device (e.g., computing device 350, previously described in connection with FIG. 3), for instance.

At 472 the method 470 can include establishing a sensor output threshold for a garment being managed based on comfort data. As described above, comfort data can include any data that can indicate sensor output values for a garment that would coincide with a comfortable fit for the consumer of the garment being managed. For example, comfort data can include consumer dimensions, manufacturer specifications, expected sensor output values, and/or baseline sensor output values. Establishing a sensor output threshold based on this comfort data can include establishing a minimum and/or maximum sensor output value from the number of sensors integrated with a garment being managed that would still coincide with a comfortable fit for the consumer.

At 474 the method 470 can include analyzing retail data for a garment. Analyzing retail data can include receiving and analyzing retail metrics for a garment. For example, analyzing retail data can include receiving and analyzing retailed-related metrics related to the garment being managed (e.g., sales of identical garments, sales of similar garments, sales of related garments, the average age of inventory of identical garments, the average age of inventory of similar garments, the average age of inventory of related garments, the age of inventory for the garment being managed, the number of times that the garment being managed has been tried on, the number of times that the garment being managed has been identified as uncomfortable by a consumer trying on the garment being managed, etc.).

In some instances, the retail data can include historical sensor output data from a number of garments associated with a number of consumers that purchased the number of garments at a common retailer. For example, the retail data for garment store X can include the historical sensor output data of all or some of the number of consumers that have purchased a particular garment at store X or its affiliates. This body of historical sensor output data not only can serve as a repository of consumer specific garment sensor output values, but also can be utilized to generate a customer profile for the average customer shopping at garment store X, in this example. The customer profile can be used to determine the garment comfort preferences and garment needs of a group of consumers that shop at a particular retailer. This information can be useful, for example, for a manufacturer to determine what types of garments to design and/or ship to a particular retailer. Additionally, the customer profiles can allow the manufacturer to develop retailer-specific specifications for its garments. For example, if the customer profile for consumers shopping at a garment store X indicates that the customers of this retailer prefer to wear, as an example, their jeans much tighter (e.g., as indicated by sensor output data showing higher pressure readings in garment sensors throughout the legs of the jeans) than consumers at other retailers, then the manufacturer can send tighter fitting jeans to store X. Additionally, the manufacturer can adjust the expected pressure sensor values of the number of pressure sensors integrated into the legs of the jeans and these adjusted expected values can be used in determining adjusted sensor output data thresholds for garments sold at store X.

At 476 the method 470 can include receiving sensor output data from a number of sensors on a garment being managed. The sensor output data can be received periodically or continuously. Once the sensor output data from a number of sensors of a garment being managed is received, the sensor output data can be added to the historical sensor output data of the retailer from which the garment being managed is purchased. That is, the historical sensor output data portion of the retail data can be updated to include the newly received sensor output data of the garment being managed.

At 478 the method 470 can include comparing the sensor output data with the sensor output threshold. This comparison can be done with every new sensor output value received from the number of sensors integrated with the garment being managed, periodically on some new sensor output values received from the number of sensors integrated with the garment being managed, or it can be done on batches of sensor output values receive the number of sensors integrated with the garment being managed.

At 480 the method 470 can include sending a notification to a party associated with the garment in response to analysis of the retail data and the sensor output data of the garment being managed crossing the sensor output threshold. The party associated with the garment can, for example, be the consumer that purchased the garment being managed, the retailer who sells the garment being managed, and/or the manufacturer of the garment being managed. The notification can be a notification related to the garment being manufactured. For example the notification can be a notification to the consumer that purchased the garment being managed indicating that the garment is reaching the end of a pre-defined lifecycle as described above. The notification can include, in another example, a notification to the retailer of the garment being managed that a particular consumer is in need of a new garment. Such a notification can identify the particular consumer. In another example, the notification can be a notification to a manufacturer and/or a retailer including the updated historical sensor output data.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A system for comfort-based garment management, comprising:
   a baseline engine to establish a sensor output threshold for a garment based on comfort data, wherein the sensor output threshold is based at least in part on baseline sensor output values that correspond with a comfortable garment fit as identified by a consumer of the garment and wherein the baseline sensor output values are associated with one or more dimensions of the consumer;
   a comfort engine to receive sensor output data from a number of sensors integrated with the garment;
   a comparison engine to compare the sensor output data with the sensor output threshold; and
   a notification engine to send a notification to a party associated with the garment in response to the sensor output data crossing the sensor output threshold.

2. The system of claim 1, including the baseline engine to establish the sensor output threshold for the garment based on comfort data, wherein the baseline sensor output values are collected while the consumer is wearing the garment.

3. The system of claim 1, including the baseline engine to establish the sensor output threshold for the garment based on comfort data, wherein the sensor output threshold is based on a manufacturer's specification for the garment.

4. The system of claim 1, including the notification engine to send the notification to the party associated with the garment in response to the sensor output data crossing the sensor output threshold, wherein the notification includes a notification that the garment is reaching the end of a pre-defined lifecycle.

5. A method for comfort-based garment management, comprising:
   establishing a sensor output threshold for a garment based on comfort data, wherein the sensor output threshold is based at least in part on baseline sensor output values that correspond with a comfortable garment fit as identified by a consumer of the garment and wherein the baseline sensor output values are associated with one or more dimensions of the consumer;

receiving sensor output data from a number of sensors integrated with the garment;

comparing the sensor output data with the sensor output threshold; and sending a notification to a party associated with the garment in response to analysis of the retail data and the sensor output data crossing the sensor output threshold.

6. The method of claim 5, wherein the method includes analyzing the retail data for the garment, wherein the retail data includes an age of inventory for the garment at a retailer.

7. The method of claim 5, wherein the method includes analyzing the retail data for the garment, wherein the retail data includes historical sensor output data from a number of garments associated with a number of consumers that purchased the number of garments at a common retailer.

8. The method of claim 7, further comprising:

updating the historical sensor output data to include the received sensor output data from the number of sensors integrated with the garment if the garment was purchased at the common retailer, and including the updated historical sensor output data in the notification.

9. The method of claim 5, wherein the method includes sending the notification to the party associated with the garment in response to analysis of the retail data and the sensor output data crossing the sensor output threshold, wherein the party associated with the garment is a consumer of the garment.

10. The method of claim 5, wherein the method includes sending the notification to the party associated with the garment in response to analysis of the retail data and the sensor output data crossing the sensor output threshold, wherein the party associated with the garment in a retailer of the garment and the notification includes the identification of a consumer of the garment.

11. The method of claim 5, wherein the method includes receiving sensor output data from a number of sensors integrated with a garment, wherein the number of sensors integrated with the garment include at least one of a heat sensor, a pressure sensor, an accelerometer, a gyroscope, a temperature sensor, a footfall sensor, a flex sensor, a thickness sensor, a chemical sensor, a tensile load sensor, a compressive load sensor, a light sensor, and a perspiration sensor.

12. A non-transitory computer readable medium storing instructions executable by a processing resource to cause a computer to:

establish a sensor output threshold for a garment based on comfort data, wherein the sensor output threshold is based at least in part on baseline sensor output values that correspond with a comfortable garment fit as identified by a consumer of the garment and wherein the baseline sensor output values are associated with one or more dimensions of the consumer;

receive sensor output data from a number of sensors on a garment;

compare the sensor output data with the sensor output threshold;

and transmit a number of notifications to a number of parties associated with the garment in response to the identification.

13. The medium of claim 12, wherein to transmit the number of notifications to the number of parties associated with the garment in response to the identification includes:

to transmit a notification identifying the suspected defective garment to a retailer and including suggestions on addressing the suspected defective garment.

14. The medium of claim 12, wherein to transmit the number of notifications to the number of parties associated with the garment in response to the identification includes:

to transmit a notification a manufacturer to replace the suspected defective garment with a non-defective garment at a retailer where the suspected defective garment is located.

* * * * *